(12) United States Patent
Nanda

(10) Patent No.: US 12,062,057 B2
(45) Date of Patent: Aug. 13, 2024

(54) SYSTEMS AND METHODS FOR FEED-BACK BASED UPDATEABLE CONTENT

(71) Applicant: ONE POINT SIX TECHNOLOGIES PRIVATE LIMITED, Mumbai (IN)

(72) Inventor: Shantiswarup Nanda, Mumbai (IN)

(73) Assignee: ONE POINT SIX TECHNOLOGIES PRIVATE LIMITED, Mumbai (IN)

( * ) Notice: Subject to any disclaimer, the term of this patent is extended or adjusted under 35 U.S.C. 154(b) by 287 days.

(21) Appl. No.: 17/357,278

(22) Filed: Jun. 24, 2021

(65) Prior Publication Data

US 2021/0319461 A1 Oct. 14, 2021

Related U.S. Application Data

(63) Continuation of application No. PCT/IN2020/050930, filed on Nov. 4, 2020.

(30) Foreign Application Priority Data

Nov. 4, 2019 (IN) .............................. 201921044548

(51) Int. Cl.
*G06Q 30/0201* (2023.01)
*G06F 16/2457* (2019.01)
(Continued)

(52) U.S. Cl.
CPC ... *G06Q 30/0201* (2013.01); *G06F 16/24578* (2019.01); *G06F 40/169* (2020.01); *G06F 40/205* (2020.01)

(58) Field of Classification Search
CPC ............ G06F 1/00–40/00; G06Q 10/00–50/00
(Continued)

(56) References Cited

U.S. PATENT DOCUMENTS 4,773,009 A * 9/1988 Kucera ................. G06F 40/253
715/260
7,236,966 B1 * 6/2007 Jackson .............. G06F 16/9535
707/999.005

(Continued)

OTHER PUBLICATIONS

WIPO, International Search Report in corresponding PCT application PCT/IN2020/050930, Feb. 4, 2021.
(Continued)

*Primary Examiner* — Alan S Miller
(74) *Attorney, Agent, or Firm* — Alley IP

(57) ABSTRACT

A system (100), for providing feed-back based updateable content, comprising a text analyzer (TA) to analyze content to determine analyzed text vectors (ATV); a reader profiler (RP) to profile a reader in terms of analyzed text vectors to obtain reader classification vectors (RCV), dynamically forming clusters of readers, parsing served content through formed clusters to obtain cluster-specific analyzed text vectors; providing a first feedback output signal in correlation with a cluster of readers in correlation with a specific analyzed text vector; causing to provide changed content, to cause a change in said specific analyzed text vector; serving said changed content; parsing said changed content dynamically formed clusters to obtain changed cluster-specific analyzed text vectors; providing a next feedback output signal; checking if said specific analyzed text vector fits within pre-defined ranges of values, provided by optimum text analyzed vectors, across said clusters; and serving said changed content.

20 Claims, 2 Drawing Sheets

(51) Int. Cl.
*G06F 40/169* (2020.01)
*G06F 40/205* (2020.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 10,922,483 | B1* | 2/2021 | Shevchenko | G06F 17/18 |
| 2001/0003185 | A1* | 6/2001 | Lee | G06F 16/5838 |
| | | | | 707/999.102 |
| 2007/0067294 | A1* | 3/2007 | Ward | G06F 16/9535 |
| 2009/0157714 | A1* | 6/2009 | Stanton | G06F 18/22 |
| 2011/0131168 | A1* | 6/2011 | Fukazawa | G06F 16/9535 |
| | | | | 706/46 |
| 2012/0272143 | A1* | 10/2012 | Gillick | G06Q 10/10 |
| | | | | 715/256 |
| 2013/0246926 | A1* | 9/2013 | Vemireddy | G06F 16/9535 |
| | | | | 715/738 |
| 2015/0213634 | A1* | 7/2015 | Karmarkar | G06T 11/001 |
| | | | | 345/589 |
| 2015/0242391 | A1* | 8/2015 | Goel | G06F 40/30 |
| | | | | 704/9 |
| 2015/0309986 | A1* | 10/2015 | Brav | G06F 16/38 |
| | | | | 707/739 |
| 2015/0370769 | A1* | 12/2015 | Pereira Filho | G06F 40/166 |
| | | | | 726/28 |
| 2018/0267951 | A1* | 9/2018 | Moah | G06F 3/04847 |
| 2018/0367480 | A1* | 12/2018 | Housman | G06F 40/247 |
| 2019/0114300 | A1* | 4/2019 | Miltsakaki | G06F 40/216 |
| 2019/0332168 | A1* | 10/2019 | Weldemariam | G02C 7/04 |
| 2020/0042547 | A1* | 2/2020 | Prakash | G06N 3/082 |
| 2020/0050620 | A1* | 2/2020 | Clark | G06F 16/24578 |
| 2020/0379755 | A1* | 12/2020 | Boada | G06F 40/232 |

OTHER PUBLICATIONS

WIPO, Written Opinion of the ISA in corresponding PCT application PCT/IN2020/050930, Feb. 4, 2021.

* cited by examiner

SYSTEMS AND METHODS FOR FEED-BACK BASED UPDATEABLE CONTENT

RELATED APPLICATIONS

This application claims priority under 35 U.S.C. § 120 to, and is a continuation of, co-pending International Application PCT/IN2020/050930, filed Nov. 4, 2020 and designating the US, which claims priority to Indian Application 201921044548, filed Nov. 4, 2019, such Indian Application also being claimed priority to under 35 U.S.C. § 119. These Indian and International applications are incorporated by reference herein in their entireties.

FIELD

This invention relates to the field of computer networks and associated content management.

BACKGROUND

For centuries together, authors have had no clue of how their books are being read or rather how their content is being consumed. This happens because book retailers created an opaque wall between content creators (writers) and content consumers (readers). Even though this industry of writers, publishers, and consumers started using digital media, i.e. e-books came into existence, it never changed the methodology of functioning.

Even today, authors do not get to know-how their content is being consumed and also do not have the ability to make real-time changes basis their understanding of reader's interest or lack thereof.

In prior arts, especially relating to e-books and publishing industry, there is no orientation for recommendation engines to perform or guide. With reviews and ratings, which is not a time-bound loop, and which is not objective either, there is no feedback that can be effectively used by a creator (author) and/or a publisher.

As a result, content industry (books, movies, music, media, and the like) is the only industry where products are never upgraded; thus, making it a very risky industry.

There is a need to resolve this issue once; since it will, then it will help alleviate the publishing industry to a 'normal-risk' industry, where a product can be upgraded consistently by its creator based on insights provided by actual consumption patterns of readers of a book.

Books that do not do well in the existing marketplace (whether it is through a digital medium or a physical medium) take up about 99.99% of the market.

There is, therefore, also a need to address this problem.

SUMMARY

Particularly, this invention relates to systems and methods for ingesting, packaging, routing, modifying, and publishing content. Specifically, this invention relates to systems and methods for systems and methods for providing a platform for feed-back based updateable content. According to this invention, there is provided systems and methods for providing a platform for feed-back based updateable content.

An object of the invention is to provide updateable content based on reader feedback.

Another object of the invention is to provide data relating to how books are being read or rather how content is being consumed.

Another object of the invention is to update content based on consumption-led data and consumption-led analytics.

Yet another object of the invention is to alleviate the status of publishing industry to a 'normal-risk' industry as opposed to a 'high-risk' industry.

According to this invention, a system for providing feedback based updateable content, in terms of feedback output signals correlative to text items from content, served on an internet enabled device with sensors, said internet enabled device being configured to serve an e-book having said content and said corresponding text items, said system comprising a computer processor communicably coupled with said internet enabled device, configured to:

define and enforce rules, concerning a text analyzer, in order to analyze said content in order to determine, per content or portion thereof, analyzed text vectors, the analyzed text vectors being selected from a group of vectors consisting of readability indicator vector, verbosity indicator vector, regional colloquialism vector, genre vector, sub-genre vector;

define and enforce rules, concerning a reader profiler, in order to analyze and profile a reader in terms of the analyzed text vectors to obtain a reader classification vectors, the reader classification vector being selected from a group of vectors consisting of language proficiency vector, content affinity vector, frequency vector, usage parameter-based vector, cluster vector;

dynamically forming clusters of readers based on at least a selected reader classification vector;

selecting two or more said dynamically formed clusters;

parsing said served content through said selected two or more dynamically formed clusters in order to obtain cluster-specific analyzed text vectors;

providing a first feedback output signal, by means of a feedback output signal provider, to be displayed in consonance with at least a first start signal text item and a first end signal text item, the text items being from said content, said first feedback output signal being in the form of tagging of text items starting from said at least a first start signal text item and ending with said at least a first end signal text item, said first feedback output signal being in correlation with a pre-defined cluster of readers in correlation with a specific analyzed text vector;

causing to change first feedback output signal tagged text items, causing changed content, in order to cause a change in said specific analyzed text vector;

serving said changed content vide changed text items to said two or more dynamically formed clusters;

parsing said changed content through said selected two or more dynamically formed clusters in order to obtain changed cluster-specific analyzed text vectors;

providing a next feedback output signal, by means of a feedback output signal provider, to be displayed in consonance with at least a first start signal text item and a first end signal text item, the text items being from said content, said next feedback output signal being in the form of tagging of text items starting from said at least a first start signal text item and ending with said at least a first end signal text item, said next feedback output signal being in correlation with said pre-defined cluster of readers in correlation with said specific analyzed text vector;

checking if said specific analyzed text vector fits within pre-defined ranges of values, provided by optimum text analyzed vectors, across said two or more dynamically formed clusters; and serving said changed content, on said internet-enabled device, only if said checked analyzed text vector conforms to said pre-defined ranges of values across said two or more dynamically formed clusters.

BRIEF DESCRIPTION OF DRAWINGS

The invention will now be described in relation to the accompanying drawings, in which.

DETAILED DESCRIPTION

Figure 1:
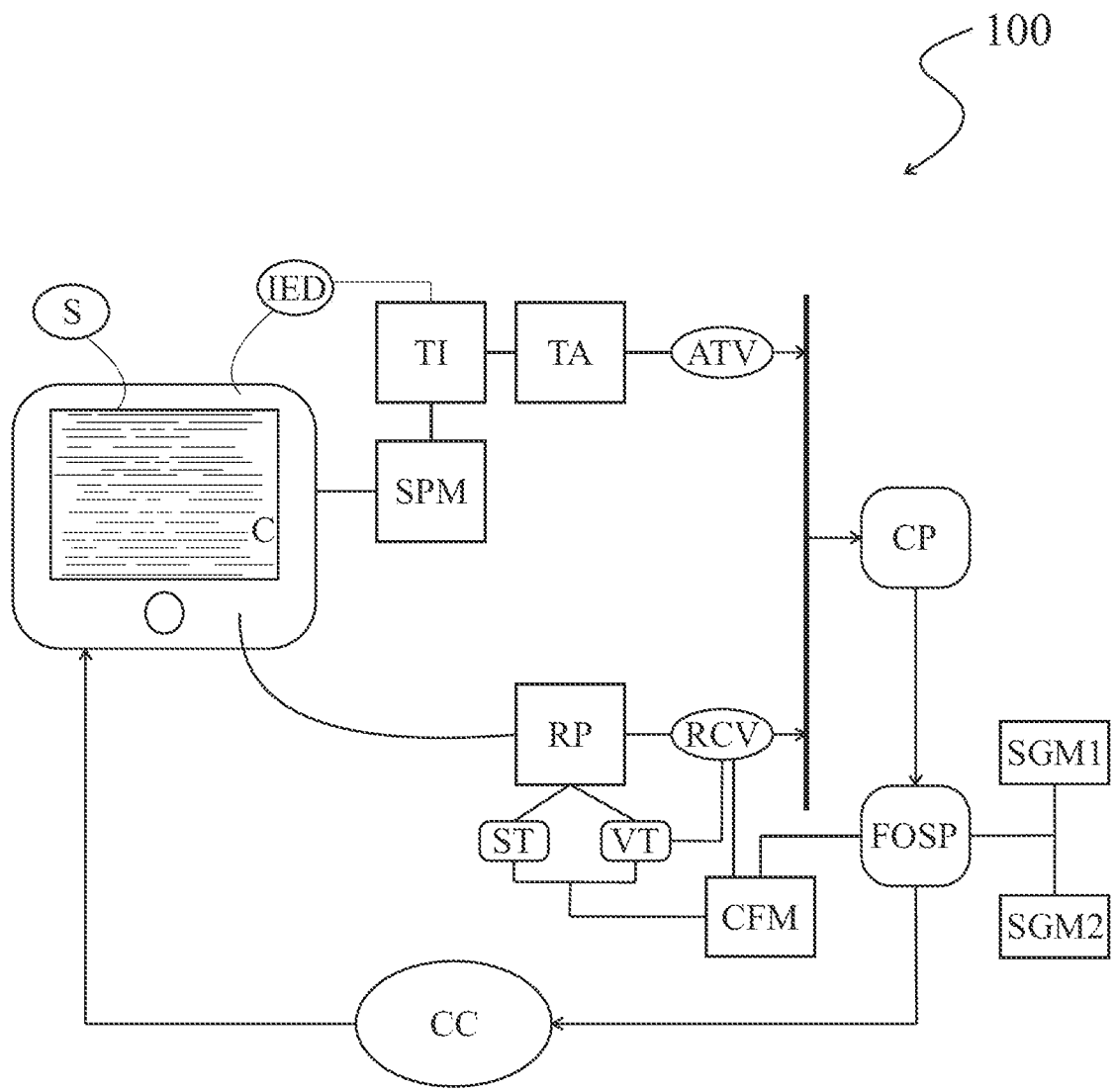
FIG. 1 illustrates a schematic block diagram of this system.

It will be understood that, although the term first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicated the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof. The use of "about" in connection with values indicates effective approximation, and such values may vary within a range having substantially similar activity or functionality.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

In at least an embodiment, said system comprises a text indexer based on screen polling, in that, a screen polling mechanism being configured to poll screen size of said internet enabled device serving said e-book, said corresponding text indexer being configured to annotate each text item from content items of said e-book with a unique "first signal", selected from a first set of signals, by means of a first signal generating mechanism; each signal from the first set of signals being called a "first signal", said text indexer being communicably coupled with said screen polling mechanism in order to tag a page-correlative start (or page-correlative first) text item per page per polled screen size, with a "page-correlative start first signal", and to further tag a page-correlative end text item per page per screen polled size, with a "page-correlative end first signal"; thereby providing a set of page-correlative start first signals corresponding to page-correlative start text items configured with a screen-relevant/screen dependent page number and further providing a set of page-correlative end first signals corresponding to page-correlative end text items configured with a screen-relevant/screen dependent page number, each of said first set of signals being activated on said internet enabled device to be sensed by a sensor array of said internet enabled device.

In at least an embodiment, said system comprising a second set of signals, each signal from the second set of signals being called a "second signal", generated by means of a second signal generating mechanism configured to be activated at text items, at pre-defined repeating intervals (typically, at discrete word intervals) throughout the e-book, or portions thereof, irrespective of screen size or page size, the repetition rate being constant throughout the e-book; thereby, forming a set of signals which are repetitive, periodically occurring, signals throughout said e-book and activated on said e-book, through said internet enabled device, in order to be sensed by a sensor array of said internet enabled device.

In at least an embodiment, a computer processor is configured to be synced with said first signal generating mechanism and said second signal generating mechanism.

In at least an embodiment, a first sensor is configured to trace user-engagement, with a page-correlative start first signal and its corresponding page-correlative start first signal, with a first timer, said first timer, coupled with the first sensor, being configured to record time spent corresponding to number of screen-relevant pages in conjunction with a prolonged time span, all recorded by said first timer, said sensed data being fed to a computer processor configured to obtain analyzed text vectors and to record speed of engagement with said repetitive, periodically occurring, signals per defined time span.

In at least an embodiment, a first sensor is configured to trace user-engagement, with a page-correlative start first signal and its corresponding page-correlative start first signal, with a first timer, said first timer, coupled with the first sensor, said first timer being pre-set with an outer time limit so that if a reader stops engaging with an e-book, on said internet enabled device, said computer processor being configured to realize this event as a reader abandoning said e-book.

In at least an embodiment, a second sensor is configured to trace user-engagement with a repetitive, periodically occurring, signal in consonance with a second timer, coupled with said second sensor, configured to record time spent from a page-correlative start first signal, per screen-relevant page, and a page-correlative end first signal, per screen-relevant page, all recorded by said second timer, said sensed data being fed to a computer processor configured to obtain analyzed text vectors and to record speed of engagement per screen, thereby, providing time-engagement data/time-responsive data correlative to any two second signal-activated text items in said e-book, or portions thereof.

In at least an embodiment, said system comprises a text indexer based on screen polling, in that, a screen polling mechanism being configured to poll screen size of said internet enabled device serving said e-book, said corresponding text indexer being configured to annotate each text item from content items of said e-book with a unique "first signal", selected from a first set of signals, by means of a first signal generating mechanism; each signal from the first set of signals being called a "first signal", said text indexer being communicably coupled with said screen polling mechanism in order to tag an e-book-correlative start (or e-book-correlative first) text item per book per polled screen size, with a "book-correlative start first signal", and to further tag an e-book-correlative end (or e-book-correlative last) text item per book per screen polled size, with a "book-correlative end first signal"; thereby providing a set of book-correlative start first signals corresponding to book-correlative start text items configured with a screen-relevant/screen dependent e-book and further providing a set of book-correlative end first signals corresponding to book-correlative end text items configured with a screen-relevant/screen dependent book identity.

In at least an embodiment, a third sensor is configured to trace user-engagement with a book-correlative start first signal and its corresponding book-correlative start first signal with a third timer, said third timer, coupled with said third sensor, being configured to record time spent corresponding to number of screen-relevant e-books in conjunction with a prolonged time span, all recorded by said third timer, said sensed data being fed to a computer processor configured to obtain analyzed text vectors and to record speed of engagement with said repetitive, periodically occurring, signals per defined time span.

In at least an embodiment, said system comprises a text indexer based on screen polling, in that, a screen polling mechanism being configured to poll screen size of said internet enabled device serving said e-book, said corresponding text indexer being configured to annotate each text item from content items of said e-book with a unique "first signal", selected from a first set of signals, by means of a first signal generating mechanism; each signal from the first set of signals being called a "first signal", said text indexer being communicably coupled with said screen polling mechanism in order to tag a chapter-correlative start (or chapter-correlative first) text item per book per polled screen size, with a "chapter-correlative start first signal", and to further tag a chapter-correlative end (or chapter-correlative end) text item per chapter per screen polled size, with a "chapter-correlative end first signal"; thereby providing a set of chapter-correlative start first signals corresponding to chapter-correlative start text items configured with a screen-relevant/screen dependent chapter and further providing a set of chapter-correlative end first signals corresponding to chapter-correlative end text items configured with a screen-relevant/screen dependent chapter identity.

In at least an embodiment, a fourth sensor is configured to trace user-engagement with a chapter-correlative start first signal and its corresponding chapter-correlative start first signal with a fourth timer, said fourth timer, coupled with said fourth sensor, being configured to record time spent corresponding to number of screen-relevant chapters in conjunction with a prolonged time span, all recorded by said fourth timer, said sensed data being fed to a computer processor configured to obtain analyzed text vectors and to record speed of engagement with the repetitive, periodically occurring, signals per defined time span.

In at least an embodiment, said system comprises a text indexer based on screen polling, in that, a screen polling mechanism being configured to poll screen size of said internet enabled device serving said e-book, said corresponding text indexer being configured to annotate each text item from content items of said e-book with a unique "first signal", selected from a first set of signals, by means of a first signal generating mechanism; each signal from the first set of signals being called a "first signal", said text indexer being communicably coupled with said screen polling mechanism in order to tag a sentence start (or sentence first) text item per book per polled screen size, with a "sentence-correlative start first signal", and to further tag a sentence-correlative end (or sentence-correlative end) text item per sentence per screen polled size, with a "sentence-correlative end first signal"; thereby providing a set of sentence-correlative start first signals corresponding to sentence-correlative start text items configured with a screen-relevant/screen dependent sentence and further providing a set of sentence-correlative end first signals corresponding to sentence-correlative end text items configured with a screen-relevant/screen dependent sentence identity.

In at least an embodiment, a fifth sensor is configured to trace user-engagement with a sentence-correlative start first signal and its corresponding sentence-correlative start first signal with a fifth timer, said fifth timer, coupled with said fifth sensor, being configured to record time spent corresponding to number of screen-relevant sentences in conjunction with a prolonged time span, all recorded by said fifth timer, said sensed data being fed to a computer processor to obtain analyzed text vectors and to record speed of engagement with the repetitive, periodically occurring, signals per defined time span.

In at least an embodiment, said text analyzer, comprising a first parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and an end first signal (being selected from at least one of a page-correlative end first signal, a book-correlative end first signal, a chapter-correlative end first signal, a sentence-correlative end first signal) in order to determine at least a readability indicator in terms of pre-defined metrics, said computer processor being configured with rules concerning derivation of readability indicator, for text items, between any two second signal-activated text items where the sensor traces and outputs time-engagement data/time-responsive data.

In at least an embodiment, said text analyzer, comprising a first parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and an end first signal (being selected from at least one of a page-correlative end first signal, a book-correlative end first signal, a chapter-correlative end first signal, a sentence-correlative end first signal) in order to determine at least a readability indicator in terms of pre-defined metrics, said computer processor being configured with rules concerning derivation of readability indicator, for text items, between any two second signal-activated text items where text analyzer determines passive voice count for that selected portion of content.

In at least an embodiment, said text analyzer, comprising a first parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and an end first signal (being selected from at least one of a page-correlative end first signal, a book-correlative end first signal, a chapter-correlative end first signal, a sentence-correlative end first signal) in order to determine at least a readability indicator in terms of pre-defined metrics, said computer processor being configured with rules concerning derivation of readability indicator, for text items, between any two second signal-activated text items where text analyzer determines number of long sentences for that selected portion of content.

In at least an embodiment, said text analyzer, comprising a second parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a verbosity indicator for an e-book.

In at least an embodiment, said text analyzer, comprising a second parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a verbosity indicator for an e-book, characterised in that, said verbosity of any content being determined, correlative to defined databases, by:
  a) ranking words, of a dictionary, in terms of their general usage: most common words to most rarely used words;
  b) defining databases, each database comprising a pre-defined bucket of words in the order of most common words used to most rarely used word such that said verbosity indicator uses databases comprising:
  a first database comprises first 3000 most commonly used words (i.e. 0 to 3000 words);
  a second database comprises 3000th to 10000th most commonly used words (i.e. 0 to 3000 words);
  a third database comprises 10000th to 40000th most commonly used words (i.e. 0 to 3000 words);
  a fourth database comprises 40000th to 60000th most commonly used words (i.e. 0 to 3000 words);
  a fifth database comprises 60000th to 80000th most commonly used words (i.e. 0 to 3000 words);
  a sixth database comprises 80000th to 100000th most commonly used words (i.e. 0 to 3000 words);
  a seventh database comprises 100000th to 130000th most commonly used words (i.e. 0 to 3000 words);
  an eighth database comprises first 13000th to 17000th most commonly used words (i.e. 0 to 3000 words);
  and so on.

In at least an embodiment, said text analyzer, comprising a second parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a verbosity indicator for an e-book, said computer processor being configured with rules concerning derivation of verbosity, for text items, between any two second signal-activated text items where the sensor traces and outputs time-engagement data/time-responsive data.

In at least an embodiment said text analyzer, comprising a first parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and an end first signal (being selected from at least one of a page-correlative end first signal, a book-correlative end first signal, a chapter-correlative end first signal, a sentence-correlative end first signal) in order to determine at least a readability indicator in terms of pre-defined metrics, said computer processor being configured with rules concerning derivation of readability indicator, for text items, between any two second signal-activated text items where text analyzer determines clichés for that selected portion of content, characterised in that, in a database a list of clichés are stored which are used to n-grams that fall into the list stored in the database of clichés, said computer processor bucketing total number of words in the order of most common words used to most rarely used words.

In at least an embodiment, said text analyzer, comprising a third parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a regional colloquialism indicator for an e-book.

In at least an embodiment, said text analyzer, comprising a third parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a regional colloquialism indicator (RCI) for an e-book, characterised in that, said colloquialism, in any content, being determined, correlative to defined geography-tagged databases, by:

a) determining phrases, words, and aphorisms, in correlation with a defined geography;
b) defining databases, each database comprising a pre-defined bucket of determined phrases, words, and aphorisms, said regional colloquialism indicator uses databases as follows:
a ninth database comprises a first-geography based bucket of words;
a tenth database comprises a first-geography based bucket of phrases;
an eleventh database comprises a first-geography based bucket of aphorisms;
a twelfth database comprises a second-geography based bucket of words;
a thirteenth database comprises a second-geography based bucket of phrases;
a fourteenth database comprises a second-geography based bucket of aphorisms;
and so on.

In at least an embodiment, said text analyzer, comprising a third parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a regional colloquialism indicator for an e-book, said computer processor being configured with rules concerning derivation of colloquialism used, for text items, between any two second signal-activated text items where the sensor traces and outputs time-engagement data/time-responsive data.

In at least an embodiment, said text analyzer, comprising a third parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a regional colloquialism indicator for an e-book, said computer processor being configured with rules concerning derivation of type of language used, for text items, between any two second signal-activated text items where the sensor traces and outputs time-engagement data/time-responsive data.

In at least an embodiment, said text analyzer, comprising a fourth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator for an e-book.

In at least an embodiment, said text analyzer, comprising a fourth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator for an e-book, characterised in that, the genre and sub-genre, of any content, being determined, correlative to pre-defined BISAC codes.

In at least an embodiment, said text analyzer, comprising a fourth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator for an e-book, said computer processor being configured with rules concerning derivation of genre, for text items, between any two second signal-activated text items where the sensor traces and outputs time-engagement data/time-responsive data.

In at least an embodiment, said text analyzer, comprising a fourth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator for an e-book, said computer processor being configured with a genre classifier configured to classify and record each e-book with a genre and feed the genre data, when the e-book is being consumed by a reader, to the communicably coupled computer processor.

In at least an embodiment, said text analyzer, comprising a fourth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator (GI) for an e-book, said computer processor (CP) being configured with "Term Frequency-Inverse document frequency" (TF-IDF) methodology in order to facilitate topic identification and genre identification.

In at least an embodiment, said text analyzer, comprising a fifth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined)

end first signal (being selected from at least one of a page-correlative end first signal, a book-correlative end first signal, a chapter-correlative end first signal, a sentence-correlative end first signal) in order to extract and determine at least a time period for an e-book using Natural Language Processing, then putting into time based buckets, and associating with page numbers.

In at least an embodiment, said text analyzer, comprising a sixth parser, is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to extract and determine at least a geography for an e-book, using Natural Language Processing, then putting into geography based buckets, and associating with page numbers.

In at least an embodiment, said computer processor is configured with rules concerning derivation of length of sentences, for text items, between any two second signal-activated text items where the sensor traces and outputs time-engagement data/time-responsive data.

In at least an embodiment, said computer processor is configured with rules concerning derivation of syntactic constructions, for text items, between any two second signal-activated text items where the sensor traces and outputs time-engagement data/time-responsive data.

In at least an embodiment, said system comprises a reader profiler configured to profile each reader in terms of static tags and variable tags, in order to obtain a computed profile, with respect to consumption of e-books basis sensed data (from said first sensor, said second sensor, said third sensor, said fourth sensor, said fifth sensor) correlative to timing (from said first timer, said second timer, said third timer, said fourth timer, said fifth timer), said profile being defined in terms of pre-defined parameters correlative to vectors, said pre-defined parameters being selected from a group consisting of language proficiency vector, content affinity vector, frequency vector, usage parameter-based vector, cluster vector.

In at least an embodiment, said system comprises a reader profiler configured to a reader parameter in terms of a proficiency index vector of a reader in order to ascribe the determined proficiency index as a proficiency tag to that reader profile.

In at least an embodiment, said system comprises a reader profiler configured to a reader parameter in terms of a content affinity index vector of a reader in order to ascribe the determined content affinity index as a content affinity tag to that reader profile.

In at least an embodiment, said system comprises a reader profiler configured to a reader parameter in terms of a frequency index vector of a reader in order to ascribe the determined frequency index as a frequency tag to that reader profile.

In at least an embodiment, a cluster formation mechanism is configured to form clusters of readers based on pre-selected reader classification vectors selected from proficiency vector, content affinity vector, and/or frequency vector, in that, various clusters of readers being formed, each cluster being defined by a pre-defined reader classification vector.

In at least an embodiment, said system comprises:
a first parameterizing module configured to parameterize an e-book in terms of its readability index;
a second parameterizing module configured to parameterize a reader in terms of their readability index correlative to clusters of reader profiles;
a mapping module configured to map pre-defined parameters of the first parameterizing module with pre-defined parameters of the second parameterizing module of a reader, the mapping being done per e-book per reader, in order to obtain a mapped parameterized correlative coefficient; and
a feedback output signal provider is configured to use mapped parameterized correlative coefficient to provide an improved output, said improved output being improved content with compliant text analyzed vectors.

In at least an embodiment, a feedback output signal provider, the communicably coupled computer processor is configured with rules to record data from said first timer, data from said second timer, data from said text analyzer correlative to said text analyzed vectors, and/or data from said reader profiler correlative to said reader classification vectors; in order to process a variety of indices per unique reader, said computer processor being configured to correlate said plurality of indices with a corresponding e-book, served on an internet enabled device with sensors, in order to provide consumption-led data per e-book as a feedback signal.

In at least an embodiment, said system's computer processor is configured with a correlator configured to correlate reading speed correlative to genre and reading speed correlative to readability index and provide a 'genre'-correlative reading speed index and a 'readability index'-correlative reading speed index. The reader profiler's static tags are also used to determine a 'normal' range of indices and to define a 'first deviated' range of indices and a 'second deviated' range of indices.

In at least an embodiment, said system's computer processor is configured with a correlator (CR) configured to check deviations from these pre-determined 'normal' range of indices to capture deviations as a function of at least a parameter from a first set of parameters and from a second set of parameters, the first set of parameters essentially being changes in text analyzed vectors and the second set of parameters being changes in reader profile vectors; such change vectors as being within a pre-defined first set of deviation range(s) and to output a first correlative feedback signal (to be displayed in consonance with at least a first start signal text item and a first end signal text item) which may be used as a feedback.

This invention discloses systems and methods for providing a platform for feed-back based updateable content.

For the purposes of this invention, the term 'e-book reader' is meant to include any internet enabled device accessible to the user, which device has a screen for viewing text items.

For the purposes of this invention, the term 'data item' or the term 'text item' is an independent word of an e-book.

For the purposes of the invention, the term 'page' is defined in terms of a screen of an e-book reader, the page having a start (first) text item and end (last) text item, with interim (middle) text items.

For the purposes of the invention, the term 'content' is defined as an e-book or a series of 'data items' or a series of 'text items'; all of which is served to a reader/user of the e-book and consumed through the e-book reader serving/hosting the e-book.

FIG. 1 illustrates a schematic block diagram of this system (100).

Figure 2:
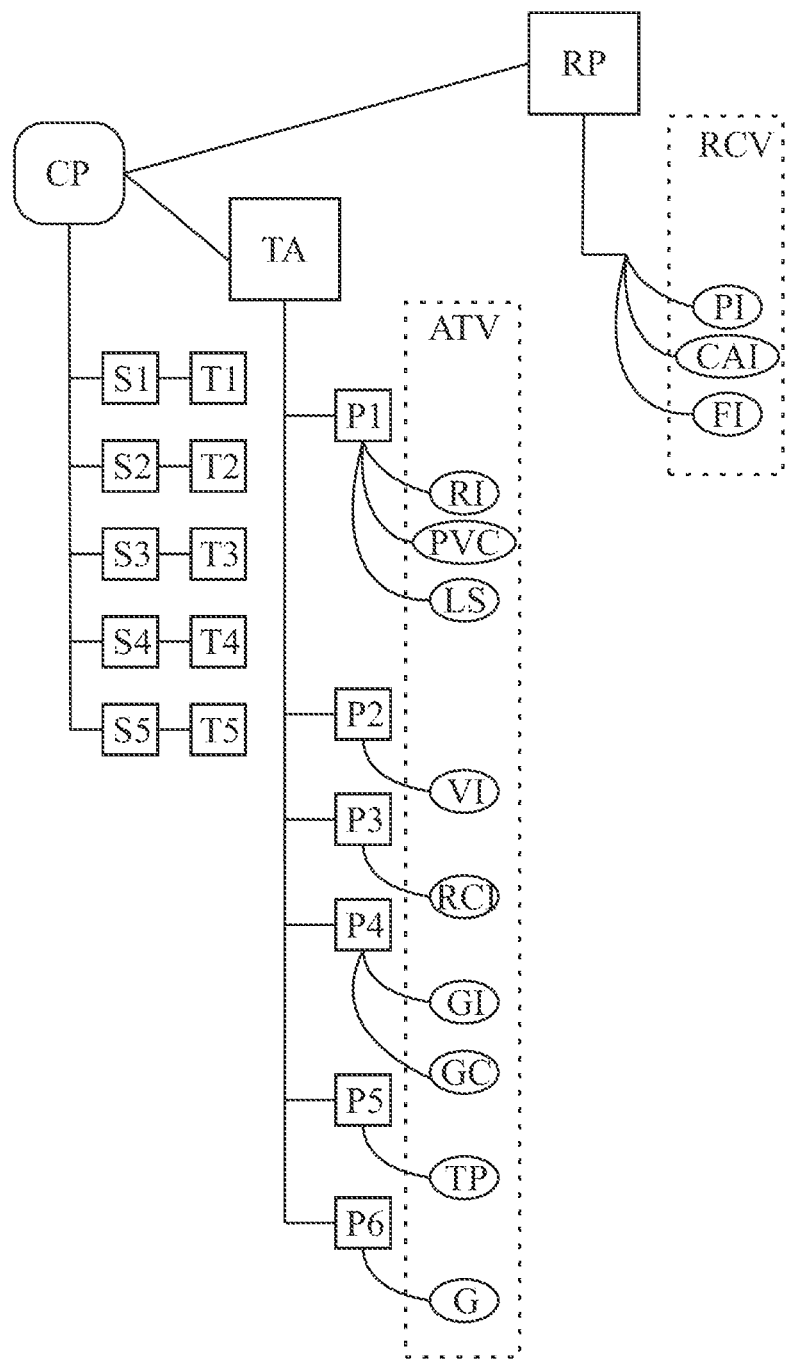
FIG. 2 illustrates a schematic block diagram concerning the computer processor of this system.

FIG. 2 illustrates a schematic block diagram concerning the computer processor (CP) of this system (100).

In at least an embodiment, there is provided a text indexer (TI) based on screen polling of the internet enabled device (IED) with sensors and serving said content (C). Since media is consumed through a variety of screens and corresponding screen sizes, for the purposes of an e-book, the concept of page numbers are redundant. Therefore, a screen polling mechanism (SPM) is configured to poll screen (S) size (height, length, etc.), of an e-book reader, and its corresponding text indexer (TI) is configured to annotate each text item from the content items of an e-book with a unique "first signal", selected from a first set of signals, by means of a first signal generating mechanism (SGM1); each signal from the first set of signals being called a "first signal". Further, the text indexer (TI) is communicably coupled with the screen polling mechanism (SPM) in order to tag a page-correlative start (or page-correlative first) text item per page per polled screen size, with a "page-correlative start first signal", and to further tag a page-correlative end text item per page per screen polled size, with a "page-correlative end first signal"; thereby providing a set of page-correlative start first signals corresponding to page-correlative start text items configured with a screen-relevant/screen dependent page number and further providing a set of page-correlative end first signals corresponding to page-correlative end text items configured with a screen-relevant/screen dependent page number. Thus, for each screen size, since the text items are re-aligned, the system, through the text indexer (TI) and the screen polling mechanism (SPM), re-calibrates, dynamically, each screen-relevant page with a start text item and an end text item, thereby providing, for each screen-relevant page, a page-correlative start first signal and a page-correlative end first signal. Each of the first set of signals is activated on the e-book to be sensed by a sensor array of the e-book.

In at least an embodiment, a second set of signals (thus, each signal from the second set of signals being called a "second signal", generated by means of a second signal generating mechanism (SGM2) is configured to be activated at text items, at pre-defined repeating intervals (typically, at discrete word intervals) throughout the e-book, or portions thereof, irrespective of screen size or page size, the repetition rate being constant throughout the e-book; thereby, forming a set of signals which are repetitive, periodically occurring, signals throughout the e-book and activated on the e-book to be sensed by a sensor array of the e-book.

In at least an embodiment, a computer processor (CP) is configured to be synced with the first signal generating mechanism (SGM1) and the second signal generating mechanism (SGM2).

In at least an embodiment, a first sensor (S1) is configured to trace user-engagement, with a page-correlative start first signal and its corresponding page-correlative start first signal, with a first timer (T1). In at least an embodiment, there is provided a first timer (T1), coupled with the first sensor (S1), configured to record time spent corresponding to number of screen-relevant pages in conjunction with a prolonged time span (e.g. date); all recorded by the first timer (T1). This sensed data is fed to the computer processor (CP). The computer processor is configured, in part, with rules concerning analyzed text vectors (ATV) to be computed by this processor (CP). This allows the processor (20) to record speed of engagement with the repetitive, periodically occurring, signals per date/per day/per defined time span. This also allows the computer processor to define average session time of reading per user. This first timer (T1) is pre-set with an outer time limit so that if a reader stops engaging with the e-book, the computer processor is configured to realize this event as a reader abandoning the e-book.

In at least an embodiment, an abandonment rate may be computed based on reader profile correlate to e-book genre cluster.

In at least an embodiment, a second sensor (S2) is configured to trace user-engagement with the repetitive, periodically occurring, signal in consonance with a second timer (T2). In at least an embodiment, there is provided a second timer (T2), coupled with the second sensor (S2), configured to record time spent from a page-correlative start first signal, per screen-relevant page, and a page-correlative end first signal, per screen-relevant page; all recorded by the second timer (T2). This sensed data is fed to the computer processor (CP). The computer processor is configured, in part, with rules concerning analyzed text vectors to be computed by this computer processor (CP). This allows the processor (CP) to record speed of engagement per screen (page on the screen of the e-book); thereby, providing time-engagement data/time-responsive data correlative to any two second signal-activated text items in the e-book, or portions thereof.

Further, the text indexer (TI) is communicably coupled with the screen polling mechanism (SPM) in order to tag an e-book-correlative start (or e-book-correlative first) text item per book per polled screen size, with a "book-correlative start first signal", and to further tag an e-book-correlative end (or e-book-correlative end) text item per book per screen polled size, with a "book-correlative end first signal"; thereby providing a set of book-correlative start first signals corresponding to book-correlative start text items configured with a screen-relevant/screen dependent e-book and further providing a set of book-correlative end first signals corresponding to book-correlative end text items configured with a screen-relevant/screen dependent book identity.

In at least an embodiment, a third sensor (S3) is configured to trace user-engagement with a book-correlative start first signal and its corresponding book-correlative start first signal with a third timer (T3). In at least an embodiment, there is provided a third timer (T3), coupled with the third sensor (S3), configured to record time spent corresponding to number of screen-relevant e-books in conjunction with a prolonged time span (e.g. date); all recorded by the third timer. This sensed data is fed to the computer processor (CP). The computer processor is configured, in part, with rules concerning analyzed text vectors to be computed by this processor (CP). This allows the processor (CP) to record speed of engagement with the repetitive, periodically occurring, signals per date/per day/per defined time span. This also allows the computer processor to define average time of reading per user per book. This third timer is pre-set with an outer time limit so that if a reader stops engaging with the e-book, the computer processor is configured to realize this event as a reader abandoning the e-book.

Further, the text indexer (TI) is communicably coupled with the screen polling mechanism (SPM) in order to tag a chapter-correlative start (or chapter-correlative first) text item per book per polled screen size, with a "chapter-correlative start first signal", and to further tag a chapter-correlative end (or chapter-correlative end) text item per chapter per screen polled size, with a "chapter-correlative end first signal"; thereby providing a set of chapter-correlative start first signals corresponding to chapter-correlative start text items configured with a screen-relevant/screen dependent chapter and further providing a set of chapter-correlative end first signals corresponding to chapter-correlative end text items configured with a screen-relevant/screen dependent chapter identity.

In at least an embodiment, a fourth sensor (S4) is configured to trace user-engagement with a chapter-correlative start first signal and its corresponding chapter-correlative start first signal with a fourth timer (T4). In at least an embodiment, there is provided a fourth timer (T4), coupled with the fourth sensor (S4), configured to record time spent corresponding to number of screen-relevant chapters in conjunction with a prolonged time span (e.g. date); all recorded by the fourth timer. This sensed data is fed to the computer processor (CP). The computer processor is configured, in part, with rules concerning analyzed text vectors to be computed by this processor (CP). This allows the processor (CP) to record speed of engagement with the repetitive, periodically occurring, signals per date/per day/per defined time span. This also allows the computer processor to define average time of reading per user per chapter of an e-book. This fourth timer is pre-set with an outer time limit so that if a reader stops engaging with the e-book, the computer processor is configured to realize this event as a reader abandoning the e-book.

Further, the text indexer (TI) is communicably coupled with the screen polling mechanism (SPM) in order to tag a sentence start (or sentence first) text item per book per polled screen size, with a "sentence-correlative start first signal", and to further tag a sentence-correlative end (or sentence-correlative end) text item per sentence per screen polled size, with a "sentence-correlative end first signal"; thereby providing a set of sentence-correlative start first signals corresponding to sentence-correlative start text items configured with a screen-relevant/screen dependent sentence and further providing a set of sentence-correlative end first signals corresponding to sentence-correlative end text items configured with a screen-relevant/screen dependent sentence identity.

In at least an embodiment, a fifth sensor (S5) is configured to trace user-engagement with a sentence-correlative start first signal and its corresponding sentence-correlative start first signal with a fifth timer (T5). In at least an embodiment, there is provided a fifth timer (T5), coupled with the fifth sensor (S5), configured to record time spent corresponding to number of screen-relevant sentences in conjunction with a prolonged time span (e.g. date); all recorded by the fifth timer. This sensed data is fed to the computer processor (CP). The computer processor is configured, in part, with rules concerning analyzed text vectors to be computed by this processor (CP). This allows the processor (CP) to record speed of engagement with the repetitive, periodically occurring, signals per date/per day/per defined time span. This also allows the computer processor to define average time of reading per user per sentence of an e-book. This fifth timer is pre-set with an outer time limit so that if a reader stops engaging with the e-book, the computer processor is configured to realize this event as a reader abandoning the e-book.

In at least an embodiment, the computer processor (CP), is configured, in part, with rules concerning a text analyzer (TA) to analyze content in order to determine, per content or portion thereof, analyzed text vectors; the analyzed text vectors being selected from a group of vectors consisting of readability indicator vector, verbosity indicator vector, regional colloquialism vector, genre vector, sub-genre vector.

In at least an embodiment of the text analyzer (TA), a first parser (P1) is configured to parse content data between a pre-defined (system-defined or user-defined) start first signal (being selected from at least one of a page-correlative start first signal, a book-correlative start first signal, a chapter-correlative start first signal, a sentence-correlative start first signal) and an end first signal (being selected from at least one of a page-correlative end first signal, a book-correlative end first signal, a chapter-correlative end first signal, a sentence-correlative end first signal) in order to determine at least a readability indicator (RI) in terms of metrics such as Automated Readability Index, Flesh-Kincaid index, Gunning Fog index, SMOG Index, Coleman-Liau Index, and/or the like.

According to a non-limiting exemplary embodiment, the indices are explained below:

Automated Readability Index:
automatedReadability ("I immediately regret this decision.");
Characters: 30
Words: 5
Sentences: 1
Automated Readability Index: 9.329999999999998
Flesch Kincaid Ease Index:
fleschKincaidEase ("I'll have a Manhattan. And kick the vermouth to the side with a pair of steel-toed boots.");
Total Words: 17
Total Sentences: 2
Total Syllables: 21
Flesch Kincaid Reading Ease: 93.70161764705884
Flesch Kincaid Grade Level
fleschKincaidGradeLevel ("He had a voice that could make a wolverine purr and suits so fine they made Sinatra look like a hobo.");
Total Words: 21
Total Sentences: 1
Total Syllables: 26
Flesch Kincaid Grade Level: 7.209523809523812
Gunning Fog Score:
gunningFog ("I love scotch. Scotchy scotch scotch. Here it goes down, down into my belly.");
Total Words: 14
Total Sentences: 3
Total Complex Words: 0
Gunning Fog Score: 1.866666666666667
SMOG Index:
smogIndex ("Oh, I can barely lift my right arm 'cause I did so many. I don't know if you heard me counting. I did over a thousand.");
Number of Sentences: 3
Polysyllabic Words: 1
SMOG index: 3.7792166259557014

Smog index of every page is calculated based on number of polysyllable words (more than 3 syllables) divided by the number of sentence according to formulas. A series is created with SMOG indices per chapter. For example: C1: 12, C2: 15, C3: 13, C4, 18. Based on this the most difficult to read chapters are identified.

Coleman-Liau Index:
colemanLiau ("Discovered by the Germans in 1904, they named it San Diego, which of course in German means 'a whale's vagina.'");
Total Characters: 86
Total Words: 20
Total Sentences: 1
Coleman Liau Index: 9.511999999999997

In at least an embodiment, the computer processor (CP) is configured, in part, with rules concerning derivation of readability indicator (RI), for text items, between any two second signal-activated text items where the sensor traces and outputs time-engagement data/time-responsive data.

In at least an embodiment, the computer processor (CP) is configured, in part, with rules concerning derivation of readability indicator, for text items, between any two second signal-activated text items where text analyzer (TA) determines passive voice count (PVC) for that selected portion of content. This can be done by using one of MINIPAR full parser, Treebank-trained full parser, CASS shallow parser, FASTUS shallow parser, Sundance shallow parser, or the like. Sentences using passive voice are identified. The percentage of sentences using passive voice in overall text is calculated based on this.

In at least an embodiment, the computer processor (CP) is configured, in part, with rules concerning derivation of readability indicator, for text items, between any two second signal-activated text items where text analyzer determines number of long sentences (LS) for that selected portion of content. Sentences having more than 30 words and more 20 syllables are considered long. A time series of sentence length is constructed. The percentage of such sentences in the overall corpus is calculated. According to a non-limiting exemplary embodiment, S1: {Words: 10, Syllables 15}, S2: {W25, 530}, S3: {W5, 58}. For overall text percentage of long sentences (more than 20 words, 3 syllables): 15%.

In at least an embodiment of the text analyzer (TA), a second parser (P2) is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a verbosity indicator (VI) for an e-book. In at least an embodiment, the verbosity of any content is determined, correlative to defined databases, by:

ranking words, of a dictionary, in terms of their general usage: most common words to most rarely used words;
  defining databases, each database comprising a pre-defined bucket of words in the order of most common words used to most rarely used word.

In at least an embodiment, the verbosity indicator uses databases as follows:

a first database comprises first 3000 most commonly used words (i.e. 0 to 3000 words);
  a second database comprises 3000th to 10000th most commonly used words (i.e. 3000 to 10000 words);
  a third database comprises 10000th to 40000th most commonly used words (i.e. 10000 to 40000 words);
  a fourth database comprises 40000th to 60000th most commonly used words (i.e. 40000 to 60000 words);
  a fifth database comprises 60000th to 80000th most commonly used words (i.e. 60000 to 80000 words);
  a sixth database comprises 80000th to 100000th most commonly used words (i.e. 80000 to 100000 words);
  a seventh database comprises 100000th to 130000th most commonly used words (i.e. 100000 to 130000 words);
  an eighth database comprises first 13000th to 17000th most commonly used words (i.e. 130000 to 170000 words);
  and so on.

In at least an embodiment, the computer processor (CP) is configured, in part, with rules concerning derivation of verbosity (VI), for text items, between any two second signal-activated text items where the sensor traces and outputs time-engagement data/time-responsive data.

In at least an embodiment, the computer processor (CP) is configured, in part, with rules concerning derivation of readability indicator (RI), for text items, between any two second signal-activated text items where text analyzer determines clichés for that selected portion of content. In a database a list of clichés are stored which are used to n-grams that fall into the list stored in the database of clichés. The computer processor (CP) buckets the total number of words in the order of most common words used to most rarely used words. For example, the first bucket includes the 3000 most common words used by people will cover 95% of everyday writing—common texts and speech like newspapers, blogs, most books, movies, etc. Data from the sorted databases, mentioned above, is used. All proper nouns are eliminated for this.

In at least an embodiment of the text analyzer (TA), a third parser (P3) is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a regional colloquialism indicator (RCI) for an e-book. In at least an embodiment, the colloquialism, in any content, is determined, correlative to defined geography-tagged databases, by:

determining phrases, words, and aphorisms, in correlation with a defined geography;
    defining databases, each database comprising a pre-defined bucket of determined phrases, words, and aphorisms.
    In at least an embodiment, the regional colloquialism indicator uses databases as follows:
    a ninth database comprises a first-geography based bucket of words;
    a tenth database comprises a first-geography based bucket of phrases;
    an eleventh database comprises a first-geography based bucket of aphorisms;
    a twelfth database comprises a second-geography based bucket of words;
    a thirteenth database comprises a second-geography based bucket of phrases;
    a fourteenth database comprises a second-geography based bucket of aphorisms;
    and so on.

Additionally, in order to identify colloquialisms used in the text, the density of colloquialisms is used as an indicator of tone of the text.

In at least an embodiment, the computer processor (CP) is configured, in part, with rules concerning derivation of colloquialism used, for text items, between any two second signal-activated text items where the sensor traces and outputs time-engagement data/time-responsive data.

In at least an embodiment, the computer processor (CP) is configured, in part, with rules concerning derivation of type of language used, for text items, between any two second signal-activated text items where the sensor traces and outputs time-engagement data/time-responsive data.

In at least an embodiment of the text analyzer (TA), a fourth parser (P4) is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to determine at least a genre and sub-genre indicator (GI) for an e-book. In at least an embodiment, the genre and sub-genre, of any content, is determined, correlative to pre-defined BISAC codes.

In at least an embodiment, the computer processor (CP) is configured, in part, with rules concerning derivation of genre, for text items, between any two second signal-activated text items where the sensor traces and outputs time-engagement data/time-responsive data.

In at least an embodiment, there is provided a genre classifier (GC) configured to classify and record each e-book with a genre and feed the genre data, when the e-book is being consumed by a reader, to the communicably coupled computer processor (20).

In at least an embodiment, "Term Frequency-Inverse document frequency" (TF-IDF) methodology is used by the computer processor (CP), for the entire book, in order to facilitate topic identification and genre identification. TF-IDF database of existing popular books, by genre, are created. Words used in the current text, are matched against the database to identify the closest match in terms of genre.

In at least an embodiment, "Term Frequency-Inverse document frequency" (TF-IDF) methodology is used by the computer processor (CP), for a chapter, to identify often repeated words. More statistically significant words, that form the core topic of the content, are ignored for this activity. A vector of number of repetitions of less important words for the topic of content and distance between each use is created. If the vector crosses a threshold, repetition very close to the previous use as well as density of repetition is formed as an output (feedback signal) to warn the author of inappropriate use.

In at least an embodiment of the text analyzer (TA), a fifth parser (P5) is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to extract and determine at least a time period (TP) for an e-book. Particularly, any dates used in a specific page are extracted using Natural Language Processing, then put into time based buckets and associated with page numbers. According to a non-liming exemplary embodiment for an e-book about World War II, Page Series can go like Page 1: 1935-1947, Page 25: 1935, Page 31: 1938, Page 71: 1940.

In at least an embodiment of the text analyzer (TA), a sixth parser (P6) is configured to parse content data between a pre-defined (system-defined or user-defined) start first signal (being selected from at least one of a page-correlative start first signal, a book-correlative start first signal, a chapter-correlative start first signal, a sentence-correlative start first signal) and a pre-defined (system-defined or user-defined) end first signal (being selected from at least one of a page-correlative end first signal, a book-correlative end first signal, a chapter-correlative end first signal, a sentence-correlative end first signal) in order to extract and determine at least a geography (G) for an e-book. Particularly, any locations used in a specific page are extracted using Natural Language Processing, then put into geography (or location) based buckets and associated with page numbers. According to a non-liming exemplary embodiment for an e-book about, extracted text can be words such as Akbar, Fatehpur Sikri, Agra, Red Fort, Raja Man Singh, Chittorgarh; and, hence, location can be India.

In at least an embodiment, the computer processor (CP), is configured, in part, with rules concerning defining a context-relevant page series.

In at least an embodiment, the computer processor (CP), is configured, in part, with rules concerning defining a context-relevant chapter series.

In at least an embodiment, the computer processor (CP), is configured, in part, with rules concerning defining a context-relevant sentence series.

In at least an embodiment, the computer processor (CP) is configured, in part, with rules concerning derivation of length of sentences, for text items, between any two second signal-activated text items where the sensor traces and outputs time-engagement data/time-responsive data.

In at least an embodiment, the computer processor (CP) is configured, in part, with rules concerning derivation of syntactic constructions, for text items, between any two second signal-activated text items where the sensor traces and outputs time-engagement data/time-responsive data.

In at least an embodiment, the computer processor (CP), is configured, in part, with rules concerning a reader profiler (RP) to analyze and profile a reader in terms of the analyzed text vectors—to obtain a reader classification vectors (RCV); the reader classification vector comprising language proficiency vector, content affinity vector, usage parameter-based vector, cluster vector, dynamic grouping of clusters.

In at least an embodiment, there is provided a reader profiler (RP) configured to profile each reader in terms of static tags (ST) and variable tags (VT). Static tags comprise demographic data, gender, age, and the like identifiers. Variable tags comprise computed profile as described further. In at least an embodiment, the reader profiler (RP) is configured to compute a profile of each reader, in order to obtain a computed profile, with respect to consumption of e-books basis the sensed data (from said first sensor, said second sensor, said third sensor, said fourth sensor, said fifth sensor) correlative to timing (from said first timer, said second timer, said third timer, said fourth timer, said fifth timer), the profile being defined in terms of parameters such as computed genre affinity, computed speed, computed time spent speed per genre, and the like computed parameters. Preferably, in at least an embodiment, a profile-based context is determined which is a function of at least genre and sub-genre, time spent per genre, and speed per genre.

In at least an embodiment, the reader profiler (RP) is configured to determine a reader parameter in terms of a proficiency index (PI) of a reader in order to ascribe the determined proficiency index as a proficiency tag (PT) to that reader.

In at least an embodiment, the reader profiler (RP) is configured to determine a reader parameter in terms of a content affinity index (CAI) of a reader in order to ascribe the determined content affinity index as a content affinity tag (CAT) to that reader.

In at least an embodiment, the reader profiler (RP) is configured to determine a reader parameter in terms of a frequency index (FI) (daily and monthly frequencies and volumes of reading) of a reader in order to ascribe the determined frequency index as a frequency tag (FT) to that reader.

In at least an embodiment, a cluster formation mechanism (CFM) is configured to, dynamically, form clusters of readers based on pre-selected reader parameters (selected from proficiency index, content affinity index, and/or frequency index). Various clusters of readers are formed, each cluster being defined by a pre-defined reader classification vector.

In at least an embodiment, the computer processor (CP) is configured with a feedback output signal provider (FOSP) to provide at least a first feedback output signal (to be displayed in consonance with at least a first start signal text item and a first end signal text item), in the form of tagging of text, of the content of the e-book, on the e-book reader (internet enabled device with sensors) in correlation with a pre-defined cluster of readers in correlation with a specific analyzed text vector. This first feedback signal may be sent only to an administrator of the system and method of this invention. In other words, this first feedback signal may not be visible to the reader, respective e-book reader nodes, but may be visible only at a server node serving the e-book. According to a non-exemplary embodiment, the feedback output signal may be a series of highlighted text items on the e-book reader along with analyzed text vectors (ATV) and/or reader classification vectors (RCV). This first feedback signal is used, iteratively, by an e-book writer in order to cause a change in at least one of the text analyzed vectors which is further pushed to the multiple clusters of reads in order to obtain a second feedback signal comprising text analyzed vectors. Each feedback signal is checked with multiple clusters and checked in terms of deviances with defined values or ranges of values per text analyzed vectors in order to obtain improved content, to be served on the internet enabled device in the form of e-book(s), with optimum text analyzed vectors for a variety of clusters comprising a variety of reader classification vectors; thereby, providing an e-book with a large acceptable audience.

In at least an embodiment, the system causes a writer of content to change the content in correlation with the first feedback output signal in order to cause a change in said specific analyzed text vector. This changed content (CC) is served vide changed text items to said two or more dynamically formed clusters. This is further parsing through said selected two or more dynamically formed clusters in order to obtain changed cluster-specific analyzed text vectors.

In at least an embodiment, the computer processor (CP) is configured with the feedback output signal provider (FOSP) to provide at least a next feedback output signal, by means of a feedback output signal provider (FOSP), to be displayed in consonance with at least a first start signal text item and a first end signal text item, the text items being from said content, said next feedback output signal being in the form of tagging of text items starting from said at least a first start signal text item and ending with said at least a first end signal text item, said next feedback output signal being in correlation with said pre-defined cluster of readers in correlation with said specific analyzed text vector.

In at least an embodiment, a first parameterizing module (PM1) is configured to parameterize an e-book in terms of its readability index.

In at least an embodiment, a second parameterizing module (PM2) is configured to parameterize a reader in terms of their readability index correlative to clusters of reader profiles.

In at least an embodiment, a mapping module (MM) is configured to map pre-defined parameters of the first parameterizing module with pre-defined parameters of the second parameterizing module of a reader, the mapping being done per e-book per reader, in order to obtain a mapped parameterized correlative coefficient.

The feedback output signal provider (FOSP) is also configured to use mapped parameterized correlative coefficient to provide an improved output.

In at least an embodiment of the feedback output signal provider (FOSP), the communicably coupled computer processor (CP) is configured, in part, with rules to record data from the first timer (T1), data from the second timer (T2), data from the text analyzer (i.e. the text analyzed vectors), and/or data from the reader profiler (RP) (i.e. the reader classification vectors); in order to process a variety of indices per unique reader. The computer processor (CP) is configured to correlate the plurality of indices with a corresponding e-book, served on an internet enabled device with sensors, in order to provide consumption-led data per e-book as a feedback signal.

In at least an embodiment, the computer processor (CP) is configured, in part, with a correlator (CR) configured to correlate reading speed correlative to genre and reading speed correlative to readability index and provide a 'genre'-correlative reading speed index and a 'readability index'-correlative reading speed index. The reader profiler's static tags are also used to determine a 'normal' range of indices and to define a 'first deviated' range of indices and a 'second deviated' range of indices.

In at least an embodiment, the mean and variance of proportional reading speed of content, located between a first start signal and a first end signal, by different reader profiles is computed. Relative reading speed is derived by dividing the reading speed of a chapter (content between a pre-defined first start signal and a first end signal) by a reader by the average overall reading speed of the reader's overall content read using this system and method.

Reading speed=Reading time/number of words

Relative Reading speed=Reading speed of chapter by user/average reading speed of user.

The correlator (CR) is configured to check deviations from these pre-determined 'normal' range of indices to capture deviations as a function of at least a parameter from a first set of parameters and from a second set of parameters, the first set of parameters essentially being changes in text analyzed vectors and the second set of parameters essentially being changes in reader profile vectors; such change vectors as being within a pre-defined first set of deviation range(s) and to output a first correlative feedback signal (to be displayed in consonance with at least a first start signal text item and a first end signal text item) which may be used as a feedback.

In at least an embodiment, the correlator checks if said specific analyzed text vector fits within pre-defined ranges of values, provided by optimum text analyzed vectors, across said two or more dynamically formed clusters.

In at least an embodiment, the system serves changed content, on said internet-enabled device, only if said checked analyzed text vector conforms to said pre-defined ranges of values across said two or more dynamically formed clusters. This changed content has increased readership and bodes well with a wider range of audiences (dynamically formed clusters) consuming said content.

The TECHNICAL ADVANCEMENT of this invention lies in providing a technical ability to provide outputs vide output feedback signals, on an internet-enabled device serving content, qua consumption-led data, qua feedback based signals received from readers; exemplary embodiments of the data being 'what is the speed at which readers are reading a e-book', 'where are the majority of readers exiting the e-book', 'what is the average session time of reading', 'how do those compare with other e-book in the same genre', and much more which was previously not possible in the realms of physical books. The system and method of this invention lies in providing a changed output basis feedback from a variety of users, discretizing reviews and provide a more thorough, objective, non-negotiable, and usable feedback for content served on the internet-enabled device.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A system for providing feed-back based updateable content, in terms of feedback output signals correlative to text items from content, served on an internet enabled device with sensors, the internet enabled device configured to serve an e-book having content and corresponding text items, the system comprising a computer processor communicably coupled with the internet enabled device, the processor configured to:
    define and enforce rules, concerning a text analyzer, to analyze the content to determine, per content or portion thereof, analyzed text vectors, the analyzed text vectors being selected from a group of vectors consisting of readability indicator vector, verbosity indicator vector, regional colloquialism vector, genre vector, and sub-genre vector;
    define and enforce rules, concerning a reader profiler, to analyze and profile a reader in terms of the analyzed text vectors to obtain reader classification vectors, the reader classification vectors being selected from a group of vectors consisting of language proficiency vector, content affinity vector, frequency vector, usage parameter-based vector, and cluster vector;
    dynamically form clusters of readers based on at least a selected reader classification vector;
    select two or more the dynamically formed clusters;
    parse the served content through the selected two or more dynamically formed clusters to obtain cluster-specific analyzed text vectors;
    provide a first feedback output signal, by a feedback output signal provider, to be displayed in consonance with at least a first start signal text item and a first end signal text item, the text items being from the content, the first feedback output signal being in the form of tagging of text items starting from the at least a first start signal text item and ending with the at least a first end signal text item, the first feedback output signal being in correlation with a pre-defined cluster of readers in correlation with a specific analyzed text vector;
    change first feedback output signal tagged text items, causing changed content, to cause a change in the specific analyzed text vector;
    serve the changed content vide changed text items to the two or more dynamically formed clusters;
    parse the changed content through the selected two or more dynamically formed clusters to obtain changed cluster-specific analyzed text vectors;
    provide a next feedback output signal, by a feedback output signal provider, to be displayed in consonance with at least a first start signal text item and a first end signal text item, the text items being from the content, the next feedback output signal being in the form of tagging of text items starting from the at least a first start signal text item and ending with the at least a first end signal text item, the next feedback output signal being in correlation with the pre-defined cluster of readers in correlation with the specific analyzed text vector;
    check if the specific analyzed text vector fits within pre-defined ranges of values, provided by optimum text analyzed vectors, across the two or more dynamically formed clusters; and
    serve the changed content, from the internet-enabled device to the e-book reader, only if the checked analyzed text vector conforms to the pre-defined ranges of values across the two or more dynamically formed clusters.

2. The system as claimed in claim 1 wherein, the system comprises a text indexer based on screen polling, in that, a screen polling mechanism is configured to poll screen size of the internet enabled device serving the e-book, the corresponding text indexer being configured to annotate each text item from content items of the e-book with a unique first signal, selected from a first set of signals, by a first signal generating mechanism; each signal from the first set of signals being called a first signal, the text indexer being communicably coupled with the screen polling mechanism to tag an object-correlative start text item per object per polled screen size, with an object-correlative start first signal, and to further tag an object-correlative end text item per object per screen polled size, with an object-correlative end first signal; thereby providing a set of object-correlative start first signals corresponding to object-correlative start text items configured with a screen-relevant/screen dependent object number and further providing a set of object-correlative end first signals corresponding to object-correlative end text items configured with a screen-relevant/screen dependent object number, each of the first set of signals being activated on the internet enabled device to be sensed by a sensor array of the internet enabled device, the object being a page object, an e-book object, a chapter object, or a sentence object.

3. The system as claimed in claim 1 wherein, the system comprises a second set of signals, each signal from the second set of signals being called a second signal, generated by a second signal generating mechanism configured to be activated at text items, at pre-defined repeating intervals throughout the e-book, or portions thereof, irrespective of screen size or page size, the repetition rate being constant throughout the e-book; thereby, forming a set of signals which are repetitive, periodically occurring, signals throughout the e-book and activated on the e-book, through the internet enabled device, to be sensed by a sensor array of the internet enabled device.

4. The system as claimed in claim 1 wherein a first sensor of the sensors is configured to trace user-engagement, with a page-correlative start first signal and its corresponding page-correlative start first signal, with a first timer, the first timer, coupled with the first sensor, is configured to record time spent corresponding to number of screen-relevant pages in conjunction with a prolonged time span, all recorded by the first timer, the sensed data being fed to a computer processor configured to obtain analyzed text vectors and to record speed of engagement with the repetitive, periodically occurring, signals per defined time span.

5. The system as claimed in claim 1 wherein a first sensor of the sensors is configured to trace user-engagement, with a page-correlative start first signal and its corresponding page-correlative start first signal, with a first timer, the first timer, coupled with the first sensor, the first timer being pre-set with an outer time limit so that if a reader stops engaging with an e-book, on the internet enabled device, the computer processor being configured to realize this event as a reader abandoning the e-book.

6. The system as claimed in claim 1 wherein a second sensor of the sensors is configured to trace user-engagement with a repetitive, periodically occurring, signal in consonance with a second timer, coupled with the second sensor, configured to record time spent from a page-correlative start first signal, per screen-relevant page, and a page-correlative end first signal, per screen-relevant page, all recorded by the second timer, and wherein the sensed data is fed to a computer processor configured to obtain analyzed text vectors and to record speed of engagement per screen, thereby, providing time-engagement data and/or time-responsive data correlative to any two second signal-activated text items in the e-book, or portions thereof.

7. The system as claimed in claim 1 wherein a third sensor of the sensors is configured to trace user-engagement with a book-correlative start first signal and its corresponding book-correlative start first signal with a third timer, the third timer, coupled with the third sensor, is configured to record time spent corresponding to number of screen-relevant e-books in conjunction with a prolonged time span, all recorded by the third timer, and wherein the sensed data is fed to a computer processor configured to obtain analyzed text vectors and to record speed of engagement with the repetitive, periodically occurring, signals per defined time span.

8. The system as claimed in claim 1 wherein a fourth sensor of the sensors is configured to trace user-engagement with a chapter-correlative start first signal and its corresponding chapter-correlative start first signal with a fourth timer, the fourth timer, coupled with the fourth sensor, is configured to record time spent corresponding to number of screen-relevant chapters in conjunction with a prolonged time span, all recorded by the fourth timer, and wherein the sensed data is fed to a computer processor configured to obtain analyzed text vectors and to record speed of engagement with the repetitive, periodically occurring, signals per defined time span.

9. The system as claimed in claim 1 wherein a fifth sensor of the sensors is configured to trace user-engagement with a sentence-correlative start first signal and its corresponding sentence-correlative start first signal with a fifth timer, the fifth timer, coupled with the fifth sensor, is configured to record time spent corresponding to number of screen-relevant sentences in conjunction with a prolonged time span, all recorded by the fifth timer, and wherein the sensed data is fed to a computer processor to obtain analyzed text vectors and to record speed of engagement with the repetitive, periodically occurring, signals per defined time span.

10. The system as claimed in claim 1 wherein, the text analyzer comprises a first parser configured to parse content data between a pre-defined start first signal and an end first signal to determine at least a readability indicator in terms of pre-defined metrics, and the computer processor is configured with rules concerning derivation of readability indicator, for text items, between any two second signal-activated text items wherein at least one of,
  the sensors trace and output time-engagement data/time-responsive data,
  the text analyzer determines passive voice count for that selected portion of content,
  the text analyzer determines number of long sentences for that selected portion of content, and
  text analyzer determines clichés for that selected portion of content, characterised in that, in a database a list of clichés are stored which are used to n-grams that fall into the list stored in the database of clichés, the computer processor bucketing total number of words in the order of most common words used to most rarely used words.

11. The system as claimed in claim 1 wherein, the text analyzer comprises a second parser configured to parse content data between a pre-defined start first signal and a pre-defined end first signal to determine at least a verbosity indicator for an e-book, the computer processor being configured with rules concerning derivation of verbosity, for text items, between any two second signal-activated text items where the sensors trace and output time-engagement data and/or time-responsive data.

12. The system as claimed in claim 1 wherein the text analyzer comprises a second parser configured to parse content data between a pre-defined start first signal and a pre-defined end first signal to determine at least a verbosity indicator for an e-book, and wherein in that the verbosity of any content is determined, correlative to defined databases, by:
  ranking words, of a dictionary, in terms of their general usage: most common words to most rarely used words; and
  defining databases, each database comprising a pre-defined bucket of words in the order of most common words used to most rarely used word such that the verbosity indicator uses,
  a first database comprising first 3000 most commonly used words,
  a second database comprising 3000th to 10000th most commonly used words,
  a third database comprising 10000th to 40000th most commonly used words,
  a fourth database comprising 40000th to 60000th most commonly used words,
  a fifth database comprising 60000th to 80000th most commonly used words,
  a sixth database comprising 80000th to 100000th most commonly used words,
  a seventh database comprising 100000th to 130000th most commonly used words, and
  an eighth database comprising first 13000th to 17000th most commonly used words.

13. The system as claimed in claim 1 wherein, the text analyzer comprises a third parser configured to parse content data between a pre-defined start first signal and a pre-defined end first signal to determine at least a regional colloquialism indicator for an e-book, and the computer processor is configured with rules concerning at least one of, derivation of colloquialism used, for text items, between any two second signal-activated text items where the sensors trace and output time-engagement data and/or time-responsive data, and derivation of type of language used, for text items, between any two second signal-activated text items where the sensors trace and output time-engagement data/time-responsive data.

14. The system as claimed in claim 1 wherein the text analyzer comprises a third parser configured to parse content data between a pre-defined start first signal and a pre-defined end first signal to determine at least a regional colloquialism indicator for an e-book, and wherein the colloquialism in any content is determined, correlative to defined geography-tagged databases, by:

determining phrases, words, and aphorisms, in correlation with a defined geography; and defining databases, each database comprising a pre-defined bucket of determined phrases, words, and aphorisms, wherein the regional colloquialism indicator uses, a ninth database comprises a first-geography based bucket of words, a tenth database comprises a first-geography based bucket of phrases, an eleventh database comprises a first-geography based bucket of aphorisms, a twelfth database comprises a second-geography based bucket of words, a thirteenth database comprises a second-geography based bucket of phrases, and a fourteenth database comprises a second-geography based bucket of aphorisms.

15. The system as claimed in claim 1 wherein the text analyzer comprises a fourth parser configured to parse content data between a pre-defined start first signal and a pre-defined end first signal to determine at least a genre and sub-genre indicator for an e-book, wherein the genre and sub-genre of any content is determined correlative to pre-defined BISAC codes.

16. The system as claimed in claim 1 wherein, the text analyzer comprises a fourth parser configured to parse content data between a pre-defined start first signal and a pre-defined end first signal to determine at least a genre and sub-genre indicator for an e-book, and the computer processor is configured with rules concerning at least one of, derivation of genre, for text items, between any two second signal-activated text items where the sensors trace and output time-engagement data/time-responsive data, and term frequency using an inverse document frequency methodology to facilitate topic identification and genre identification.

17. The system as claimed in claim 1 wherein the text analyzer comprises, a fourth parser configured to parse content data between a pre-defined start first signal and a pre-defined end first signal to determine at least a genre and sub-genre indicator for an e-book, the computer processor is configured with a genre classifier configured to classify and record each e-book with a genre and feed the genre data, when the e-book is consumed by a reader, to the communicably coupled computer processor, a fifth parser configured to parse content data between a pre-defined start first signal and a pre-defined end first signal to extract and determine at least a time period for an e-book using Natural Language Processing, then putting into time based buckets, and associating with page numbers, and a sixth parser configured to parse content data between a pre-defined start first signal and a pre-defined end first signal to extract and determine at least a geography for an e-book, using Natural Language Processing, then putting into geography based buckets, and associating with page numbers.

18. The system as claimed in claim 1 wherein the computer processor is configured with rules concerning at least one of, derivation of length of sentences, for text items, between any two second signal-activated text items where the sensors trace and output time-engagement data and/or time-responsive data, and derivation of syntactic constructions, for text items, between any two second signal-activated text items where the sensors trace and output time-engagement data and/or time-responsive data.

19. The system as claimed in claim 1 wherein, the system further comprises:

a first parameterizer configured to parameterize an e-book in terms of its readability index;

a second parameterizer configured to parameterize a reader in terms of their readability index correlative to clusters of reader profiles;

a mapper configured to map pre-defined parameters of the first parameterizing module with pre-defined parameters of the second parameterizing module of a reader, the mapping is done per e-book per reader, to obtain a mapped parameterized correlative coefficient; and a feedback output signal provider configured to use mapped parameterized correlative coefficient to provide an improved output, the improved output is improved content with compliant text analyzed vectors, wherein the computer processor is configured with rules to record data from the first timer, data from the second timer, data from the text analyzer correlative to the text analyzed vectors, and/or data from the reader profiler correlative to the reader classification vectors; to process a variety of indices per unique reader, and correlate the plurality of indices with a corresponding e-book, served on an internet enabled device with sensors, to provide consumption-led data per e-book as a feedback signal.

20. A method of providing feed-back based updateable content, in terms of feedback output signals correlative to text items from content, served on an internet enabled device with sensors, the internet enabled device configured to serve an e-book having content and corresponding text items, with a computer processor communicably coupled with the internet enabled device, the method comprising:

defining and enforcing rules, concerning a reader profiler, to analyze and profile a reader in terms of the analyzed text vectors to obtain reader classification vectors, the reader classification vectors being selected from a group of vectors consisting of language proficiency vector, content affinity vector, frequency vector, usage parameter-based vector, and cluster vector;

dynamically forming clusters of readers based on at least a selected reader classification vector;

selecting two or more of the dynamically formed clusters;

parsing the served content through the selected two or more dynamically formed clusters to obtain cluster-specific analyzed text vectors;

providing a first feedback output signal, by a feedback output signal provider, to be displayed in consonance with at least a first start signal text item and a first end signal text item, the text items being from the content, the first feedback output signal being in the form of tagging of text items starting from the at least a first start signal text item and ending with the at least a first end signal text item, the first feedback output signal being in correlation with a pre-defined cluster of readers in correlation with a specific analyzed text vector;

changing first feedback output signal tagged text items, causing changed content, to cause a change in the specific analyzed text vector;

serving the changed content vide changed text items to the two or more dynamically formed clusters;

parsing the changed content through the selected two or more dynamically formed clusters to obtain changed cluster-specific analyzed text vectors;

providing a next feedback output signal, by a feedback output signal provider, to be displayed in consonance with at least a first start signal text item and a first end signal text item, the text items being from the content, the next feedback output signal being in the form of tagging of text items starting from the at least a first start signal text item and ending with the at least a first end signal text item, the next feedback output signal being in correlation with the pre-defined cluster of readers in correlation with the specific analyzed text vector;

checking if the specific analyzed text vector fits within pre-defined ranges of values, provided by optimum text analyzed vectors, across the two or more dynamically formed clusters; and serving the changed content, from the internet-enabled device to the e-book reader, only if the checked analyzed text vector conforms to the pre-defined ranges of values across the two or more dynamically formed clusters, wherein the method is performed with the computer processor.

\* \* \* \* \*